United States Patent [19]
Yagi et al.

[11] Patent Number: 5,020,616
[45] Date of Patent: Jun. 4, 1991

[54] POWER STEERING APPARATUS

[75] Inventors: Tadashi Yagi; Masahiko Noguchi, both of Osaka; Hajime Kozuka, Tokyo; Mitsuharu Morishita; Masayoshi Onishi, both of Himeji, all of Japan

[73] Assignee: Mitsubishi Denki K.K., Tokyo, Japan

[21] Appl. No.: 360,912

[22] PCT Filed: Sep. 9, 1988

[86] PCT No.: PCT/JP88/00915
§ 371 Date: Mar. 10, 1989
§ 102(e) Date: Mar. 10, 1989

[87] PCT Pub. No.: WO89/02387
PCT Pub. Date: Mar. 23, 1989

[30] Foreign Application Priority Data

Sep. 11, 1987 [JP] Japan .................. 62-228741
Sep. 11, 1987 [JP] Japan .................. 62-228742
Sep. 11, 1987 [JP] Japan .................. 62-228743

[51] Int. Cl.$^5$ ............................. B62D 5/04
[52] U.S. Cl. .................. 180/79.1; 73/118.1; 73/862.33; 364/424.05; 439/15
[58] Field of Search ............ 180/79.1, 142, 141; 439/15; 73/862.33, 118.1; 364/424.01, 424.05

[56] References Cited
U.S. PATENT DOCUMENTS 3,631,327 12/1971 Payne ...................... 318/628
4,173,265 11/1979 Kizemer .............. 73/862.33 X
4,635,741 1/1987 Morisaita et al. ........... 180/79.1
4,645,024 2/1987 Takabayashi ............... 180/79.1
4,836,795 6/1989 Schauer ................... 439/15 X

FOREIGN PATENT DOCUMENTS 286053 10/1988 European Pat. Off. ........ 180/79.1
89/02386 3/1989 PCT Int'l Appl. ............ 180/79.1

Primary Examiner—Mitchell J. Hill
Attorney, Agent, or Firm—Sughrue, Mion, Zinn, Macpeak & Seas

[57] ABSTRACT

A power steering apparatus for power steering the steerable wheels of a vehicle is disclosed which includes a steering column having one end connected with a steering wheel and the other end operatively connected with the steerable wheels; a cylindrical housing surrounding the steering column and providing a space therebetween; a torque sensor disposed in the housing for detecting a steering torque exerted on the steering wheel by a driver; a conductor or lead line wound around the steering column and accommodated in the housing, the lead line having one end electrically connected to the torque sensor and the other end to terminals which are disposed outside the steering column; and a motor installed on the housing and operatively connected with the steering column for power assisting the steering effort exerted on the steering wheel by the driver, the motor being driven to run in accordance with the steering torque detected by the torque sensor. A rotation limiting mechanism is provided between the steering column and the housing for limiting the rotation of the steering column within a predetermined range.

12 Claims, 8 Drawing Sheets

FIG. I

POWER STEERING APPARATUS

TECHNICAL FIELD

The present invention relates to a power steering apparatus for vehicles which assists the steering force required by the driver of a vehicle to steer the steerable wheels by means of the rotational force of an electric motor.

BACKGROUND ART

Many power steering apparatus have been developed in which, based on a detected steering torque exerted on a steering wheel by the driver of a vehicle, an electric motor for steering assistance is driven to operate so that the force applied to the steering wheel by the driver is assisted by the rotational force of the motor to provide the driver with good steering feel.

When the driver of a vehicle operates the steering wheel so as to steer the vehicle to the right or left from its neutral or straight-running state, the steerable wheels are subjected to resistive forces acting thereon from the road surface in the direction to resist the steering motion of the driver. Such resistive forces become considerably great particularly when the vehicle stands still, travels at low speed, or travels on a bad road, so that the driver is required to exert a relatively large force for proper steering operation. Therefore, in order to alleviate the force or labor of a driver required for steering and enable the driver to have good or excellent steering feel, many power steering apparatus have been developed and realized. Of these power steering apparatus, there is a one of the type in which steering torque, which is generated on a steering shaft or column operatively connected with the steering wheel in accordance with steering efforts exerted thereon by the driver, is detected by a torque sensor which is installed on the steering column so that on the basis of the direction and magnitude of steering torque thus detected, a motor is operated to run thereby to provide an appropriate assistant force for assisting the steering operation of the driver.

In this type of power steering apparatus, the steering column comprises an input shaft operatively coupled to the steering wheel, an output shaft operatively coupled to a motion-conversion mechanism which converts rotational movement of the steering wheel into steering movement of the steerable wheels, and a torsion bar through which the input and output shafts are connected with each other in a coaxial relation. The steering torque exerted on the steering wheel by the driver is detected by the torque sensor such as a potentiometer provided on the junctions of the input and output shafts as a relative displacement between the input and output shafts due to a twist of the torsion bar, e.g., as an output voltage of the potentiometer. The rotational force of the motor is transmitted to an intermediate portion of the output shaft near the location at which the torque sensor is installed.

With the power steering apparatus as constructed above, due to the arrangement where the potentiometer serving as the torque sensor is mounted on the steering column which rotates together with the steering wheel, the application of an input voltage to and the taking out of an output voltage from the potentiometer are effected through slip rings, which are disposed around the potentiometer, and brushes which are secured to a housing surrounding the steering column and which are in electrical and sliding contact with the slip rings. However, such an arrangement involves the following disadvantages: in the event that the electrical contact between the brushes and the slip rings are poor, there arises the possibility that it becomes impossible to effect the detection of steering torque; and the accuracy in detection of steering torque is substantially reduced. For these reasons, it is required to make assembly of these contacting portions with great care, thus resulting in increased time and labor for assembling thereof.

On the other hand, even if such assembling has been properly effected and the electrical contact between the brushes and the slip rings is good at the initial periods, a poor contact therebetween resulting from wear over time will unavoidably take place so that the detection accuracy of the torque sensor deteriorates as time passes. Further, the electrical connection between the brushes and the slip rings are sometimes made discontinuous due to vibrations of the brushes which are caused by vibrations of the body of a vehicle during travel thereof, as a result of which it becomes impossible to detect steering torque in a continuous manner whereby the motor is driven to run discontinuously or intermittently, causing queer or unpleasant steering operation.

The above problems and disadvantages will also be involved in a power steering apparatus in which instead of a potentiometer, a strain gage, which is attached to a portion of the steering column, is employed as the torque sensor.

DISCLOSURE OF THE INVENTION

In view of the above, the present invention is intended to obviate the above-described problems of the conventional art.

An object of the present invention is to provide a power steering apparatus which is capable of simplifying the assembly of a torque sensor into a steering column.

Another object of the present invention is to provide a power steering apparatus in which the deterioration in detection accuracy of the torque sensor over time can be effectively avoided, and discontinuation in detecting steering torque resulting from vibrations of the vehicle body can be prevented so that the vehicle is continuously steered to a magnitude corresponding exactly to the amount of steering given to the steering wheel by the driver.

A further object of the present invention is provide a power steering apparatus in which the output of the torque sensor can be taken out through a lead line directly connected therewith; cuttings or breaks of the lead line can be effectively prevented; the length of the lead line as required can be made as short as possible; and there are no or little restrictions on the mounting position of the torque sensor.

In order to achieve the above objects, a power steering apparatus in accordance with the present invention comprises: a steering wheel; a steering column having one end connected with the steering wheel and the other end operatively connected with the steerable wheels; a housing means surrounding the steering column; a torque sensor disposed in the housing means for detecting a steering torque exerted on the steering wheel by a driver; a lead line wound around the steering column and accommodated in the housing means, the lead line having one end electrically connected to the torque sensor and the other end to terminal means which is disposed outside the steering column; and a motor installed on the housing means and operatively connected with the steering column for power assisting the steering effort exerted on the steering wheel by the driver, the motor being driven to run in accordance with the steering torque detected by the torque sensor.

According to the present invention, by way of the lead line directly connected between the terminals secured to the steering column housing and the torque sensor, an input voltage is supplied to the torque sensor from an external power source and at the same time an output voltage is taken out from the torque sensor.

The power steering apparatus may further comprise a rotation limiting means disposed between the steering column and the housing means for limiting the rotation of the steering column within a predetermined range.

In one embodiment, the rotation limiting means comprises: a cylindrical movable member disposed in the housing means for axial movement relative thereto, the movable member being fitted over the steering column and threadedly engaged at its inside surface with the outer peripheral surface of the steering column; a restriction member disposed between the housing means and the movable member for restricting the rotation of the movable member relative to the housing means while permitting the axial movement of the movable member relative to the housing means; and stop means for limiting the range of axial movement of the movable member with respect to the steering column.

In a preferred embodiment, the housing means comprises a cylindrical housing having a threaded hole radially formed through the cylindrical side wall thereof, and a movable member having an axial elongated groove formed in its outer peripheral surface over the entire axial length thereof. The restriction member comprises a screw threaded into the threaded radial hole in the cylindrical side wall of the housing, the screw having a tip projected into and slidably engaged with the elongated groove in the movable member.

Preferably, a protective means such as an O ring, a lining, a covering or the like formed of an elastomeric material having a low coefficient of friction may be provided either on the tip of the screw or the surface of the elongated groove in the movable member for preventing the screw tip from directly contacting the groove surface. This serves to substantially reduce the resultant wear on the screw tip and the generation of noise during the axial movement of the movable member relative to the screw tip.

In a further preferred embodiment, the housing means comprises a cylindrical housing, and the rotation limiting means comprises: a cylindrical movable member fitted in the housing means and threadedly engaged at its outside surface with the inner peripheral surface of the cylindrical housing, the movable member being fitted over the steering column for axial movement relative thereto; a restriction member disposed between the steering column and the movable member for restricting the rotation of the movable member relative to the steering column while permitting the axial movement of the movable member relative to the steering column; and stop means for limiting the range of axial movement of the movable member with respect to the steering column. In this embodiment, the movable member has an axial elongated groove formed in its inner peripheral surface over the entire axial length thereof, and the restriction member comprises a key secured to the outer peripheral surface of the steering column and slidably engaged with the axial elongated groove.

The stop means may comprise a pair of first and second limit stops which are provided either on the cylindrical housing or the steering column at locations axially spaced a predetermined distance from each other on the opposite sides of the movable member. The first and second limit stops are adapted to be selectively placed in abutting engagement with a corresponding one of the opposite ends of the movable member for defining a range of the axial movement of the movable member relative to the steering shaft.

The power steering apparatus further comprises a cylindrical bearing casing firmly fitted in the cylindrical housing at its one end for rotatably supporting one end of the steering column. In one embodiment, the first limit stop comprises a shoulder formed in the inner surface of the cylindrical housing at its other end, and the second limit stop comprises an end face of the cylindrical bearing casing which is disposed in an axially spaced face-to-face relation with respect to the shoulder. In another embodiment, the first and second limit stops comprise a pair of nuts which are threadedly fitted over the steering column at locations axially spaced from each other.

The above and other objects, features and advantages of the present invention will become more apparent from the following detailed description of a presently preferred embodiment thereof when taken in conjunction with the accompanying drawings.

DESCRIPTION OF THE PREFERRED EMBODIMENT OF THE INVENTION

A preferred embodiment of a power steering apparatus in accordance with the present invention will now be described with reference to the accompanying drawings.

Figure 1:
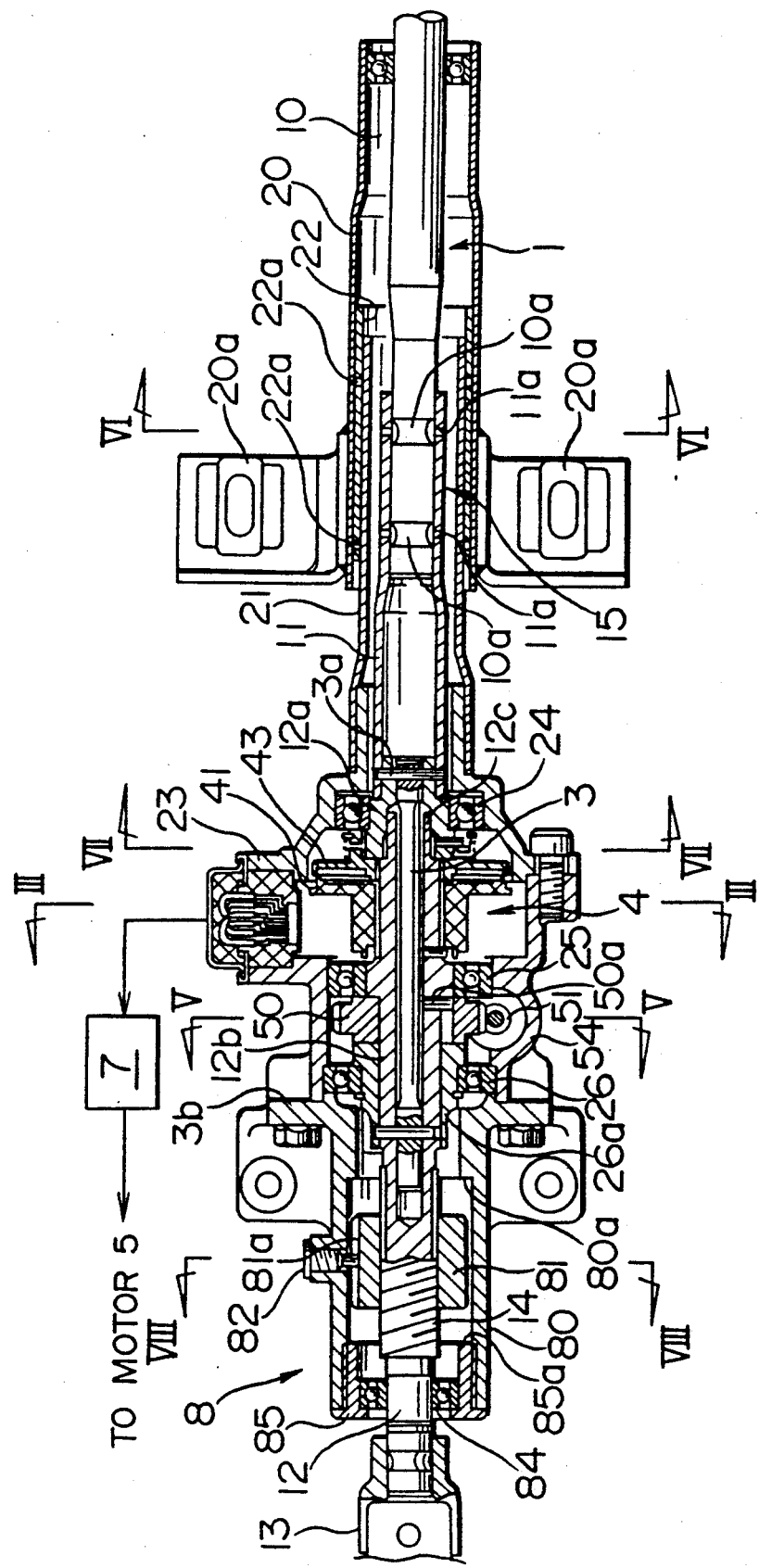
FIG. 1 is a side elevational view, in longitudinal cross section, of a power steering apparatus according to the present invention.

In FIG. 1, there is illustrated a power steering apparatus for vehicles constructed in accordance with the principles of the present invention. The power steering apparatus illustrated is of a so-called safety steering wheel structure which is adapted to absorb any excessive impact acting on a steering wheel in the axial direction of a steering column for protecting the driver of a vehicle in the event of a collision.

Figure 6:
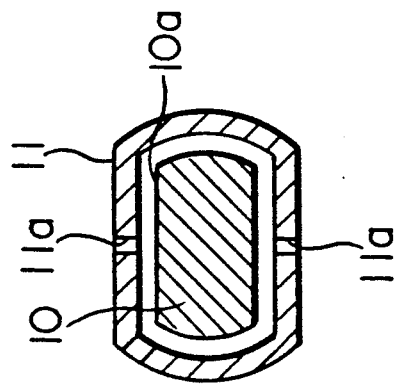

The power steering apparatus includes a steering shaft or column, generally indicated by reference numeral 1, which is adapted to rotate about its own axis together with the turning motion of a steering wheel. The steering column 1 comprises an upper shaft 10 having an unillustrated steering wheel fixedly secured to the upper end thereof (the right-side end in FIG. 1) in a coaxial relation, a lower shaft 12 coupled at its upper end to the lower end of the upper shaft 10 in a coaxial relation through a coupling member 11 in the form of a thin-walled hollow cylinder which is formed at its upper end with a flat portion, as clearly shown in FIG. 6. Similar to the coupling member 11, the upper shaft 10 is formed at its lower end with a flat portion, as shown in FIG. 6, which has on its outer peripheral surface a pair of annular grooves 10a, 10a spaced in the axial direction by an appropriate distance. The coupling member 11 has at its upper portion two rows of small round holes 11a, 11a . . . formed therethrough at locations axially spaced one row from the other by the same distance as that between the annular grooves 10a, 10a. The flat portion of the upper shaft 10 is first inserted into the flat portion of the coupling member 11 with a limited clearance formed therebetween, as illustrated in FIG. 6, and then the round holes 11a, 11a . . . in the coupling member 11 are disposed radially outside the annular grooves 10a, 10a in the upper shaft 10 in alignment therewith. Thereafter, a molten resin is poured into the annular grooves 10a, 10a through the small round holes 11a, 11a . . . and cooled to solidify so as to connect the upper shaft 10 and the lower shaft 12 with each other.

In this connection, it is to be noted that a coupling portion 15, which is constituted by the confronting flat portions of the upper and lower shafts 10, 12 and the solidified resin filled therebetween, has sufficient strength against circumferential forces imposed between the upper and lower shafts 10, 12 during normal steering operations so that it forms a strong coupling between the upper and lower shafts 10, 12, but on the other hand, when subjected to an excessively great impactive force acting in the axial direction, the resin coupling between the upper and lower shafts 10, 12 is broken under shear stress, permitting the upper shaft 10 to move relative to the lower shaft 12 in the axial direction so as to absorb the impactive force.

The upper shaft 10 is disposed in and supported by a cylindrical upper housing 20, which is fitted at its lower end over the upper end of a cylindrical coupling housing 21 surrounding the coupling member 11, through a ball retainer member 22 in the form of a thin-walled cylinder which retains two rows of small balls 22a, 22a . . . at locations axially spaced one row from the other by an appropriate distance. The upper housing 20 is fixedly secured to a portion of the vehicle body through a bracket 20a disposed outside the lower end of the upper housing 20, and unillustrated fastening bolts. The bracket 20a serves as a one-way bracket a portion of which is broken by an excessively great force acting on the upper housing 20 in the axially downward direction thereof.

In this arrangement, if an excessively great impactive force is imposed on the upper shaft 10 in the axially downward direction, the resin coupling the upper and lower shafts 10, 12 will be broken and at the same time the bracket 20a supporting the upper housing 20 on the vehicle body will also be broken, whereby the upper shaft 10 is caused to displace relative to the coupling member 11, and simultaneous with this, the upper housing 20 is also caused to displace relative to the coupling housing 21. During such a relative displacement between the upper and coupling housings 20, 21, the impactive force is absorbed by frictional resistance which is created between the small balls 22a, 22a . . . held between the upper and lower housings 20, 21 and the inner and outer peripheral surfaces of these housings, as is well known in the art.

The lower shaft 12 is accommodated in a cylindrical lower housing 23 disposed beneath the coupling housing 21. The lower shaft 12 comprises an upper input shaft 12a and a lower output shaft 12b which are connected with each other through a torsion bar 3 in axial alignment with each other. The torsion bar 3 has a reduced-diameter portion of uniform circular cross section formed at the longitudinal center thereof. The input shaft 12a is journalled by the coupling housing 21 through ball bearings 24, and it is formed of a short hollow cylinder having an axial bore which extends along the central axis of the cylinder over the entire axial length thereof. The upper end of the input shaft 12a is inserted into the lower end of the coupling member 11 and fixedly coupled thereto by fastening pins 3a radially extending therethrough, together with the upper end of the torsion bar 3 which is received in the input shaft bore. As a result, the input shaft 12a rotates together with the rotation of the upper shaft 10, i.e., with the turning of the steering wheel.

Figure 7:
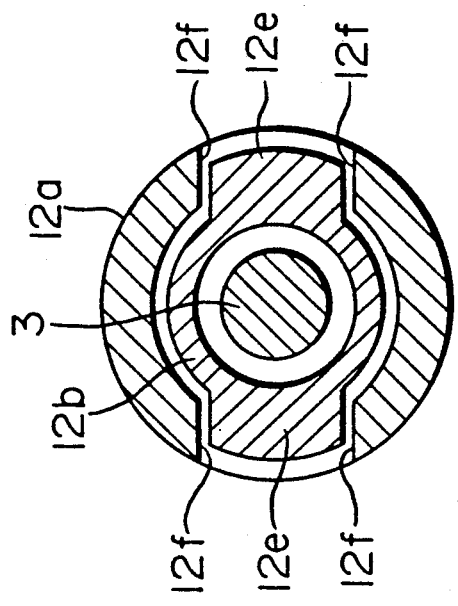
FIGS. 6 and 7 are cross sectional views, on an enlarged scale, of the steering column taken along the lines VI—VI and VII—VII, respectively, of FIG. 1.

The output shaft 12b is journalled through ball bearings 25, 26 by the lower housing 23 at the central and lower portions thereof, respectively The lower end of the torsion bar 3 is inserted in an axial bore formed in the output shaft 12b along the axis thereof, and fixedly secured to the output shaft 12b by means of fastening pins 3b radially extending therethrough. On the other hand, the upper end 12c of the output shaft 12b is fitted into the hollow interior of the input shaft 12a with a limited annular clearance formed therebetween so as to serve as a bearing for the lower end of the input shaft 12a. Further, as depicted in FIG. 7, the input and output shafts 12a, 12b are each provided at their confronting portions with stops 12e, 12f, respectively, for restricting any excessive amount of relative circumferential displacement between the input and output shafts 12a, 12b resulting from an excessive amount of twist of the torsion bar 3. The lower end of the output shaft 12b is coupled through a universal joint 13 to an unillustrated steering gear which acts to convert the turning motion of the steering wheel into a linear motion in the transverse direction of the vehicle body for steering the vehicle in such a manner that the steerable wheels are caused to steer in accordance with the direction and the angle or amount of rotation of the output shaft 12b.

When a steering torque is imposed on the upper shaft 10 due to a steering operation of the driver, the input shaft 12a is caused to turn about its own axis in accordance with the steering torque on one hand, but the motion-converting operation of the steering gear is restricted by resistive or frictional forces acting on the steerable wheels from the road surface on which the vehicle is traveling, thereby suppressing the rotational motion of the output shaft 12b which is operatively connected with the steering gear. As a result, the torsion bar 3 interposed between the input and output shafts 12a, 12b is forced to twist in correspondence to the direction and magnitude of the steering torque whereby an amount of relative displacement corresponding to the twist is produced between the input and output shafts 12a, 12b.

The torque sensor 4 for detecting steering torque comprises a sleeve 40 which is loosely fitted over the output shaft 12b, and a potentiometer installed on the sleeve 40 in such a manner that it provides an output voltage which varies with the amount of relative displacement between the input and output shafts 12a, 12b. The sleeve 40 has its opposite end faces placed in abutment with the lower end of the input shaft 12a and an upper shoulder, respectively, which is formed on an enlarged diameter portion of the output shaft 12b at a location intermediate the ends thereof at which the ball bearing 25 is mounted on the output shaft 12b, so as to suppress the axial movement of the sleeve 40.

Figure 2:
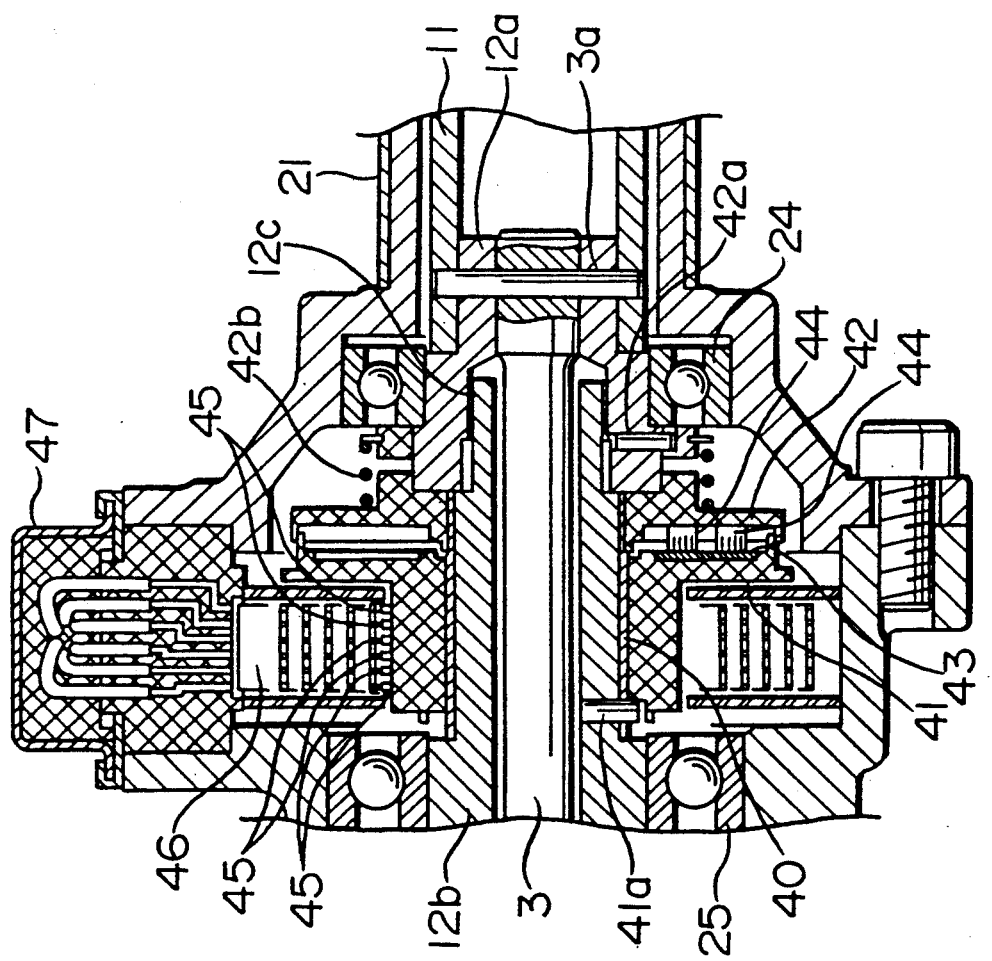
FIG. 2 is a cross sectional view, on an enlarged scale, of an essential portion of the power steering apparatus of FIG. 1, showing the mounting state of a torque sensor and its related members disposed nearby.

FIG. 2 shows the arrangement of the torque sensor 4 and its related parts on an enlarged scale. As clearly seen from this figure, the torque sensor 4 comprises a first holder 41 press fitted over the sleeve 40 and engaged by a dowel pin 41a, which is implanted in the outer peripheral surface of the output shaft 12b, so that it together with the sleeve 40 is prevented from rotation relative to the output shaft 12b, and a second holder 42 holding the torque sensor 4. The second holder 42 comprises a lower half rotatably fitted over the sleeve 40, and an upper half loosely fitted over the lower end portion of the input shaft 12a, the upper half being engaged by a dowel pin 42a, which is implanted in the outer peripheral surface of the input shaft 12a, so that it is prevented from rotation relative to the input shaft 12a. A biasing spring 42b is disposed under compression between the second holder 42 and the ball bearing 24 supporting the input shaft 12a for biasing the second holder 42 in the downward direction toward the first holder 41 so that the upper end face of the first holder 41 and the lower end face of the second holder 42 are maintained substantially perpendicular to the axis of the lower shaft 12 in an axially spaced face-to-face relation with respect to each other with a predetermined axial clearance formed therebetween. The first holder 41 is concentrically provided on its upper end face with an annular resistance element 43 having an appropriate radial width, and on the other hand, the second holder 42 is provided at its lower end face with detector elements 44 which are radially spaced from each other and which are placed in sliding contact with the resistance element 43 at appropriate circumferential locations. Though in FIG. 2, two detector elements 44 are illustrated of which one serves as backup if the other should fail, it is also possible to employ only one or more than two detector elements 44 if desired.

The holder 41 has a cylindrical lower portion, as shown in FIG. 2, which is provided on its outer peripheral surface with a plurality of input/output terminals 45, 45 . . . disposed at appropriate intervals in the axial direction. The input/output terminals 45, 45 . . . comprises two pair of input terminals electrically connected to the opposite ends of the resistance element 43 through the interior of the first holder 41, and two output terminals electrically connected to the detector elements 44, 44, respectively, through an unillustrated pre-amplifier built in the first holder 41. The input/output terminals 45, 45 . . . are electrically connected to a terminal box 47 secured to the lower housing 23 via a conductor or lead line 46 in the form of a flat cable including, in the illustrated embodiment, six lead wires which are respectively connected with the terminals 45, 45 . . . , arrayed in one direction and covered with a common insulating sheath. In this manner, the resistance element 43 is electrically connected at its one end to an unillustrated external source of power, and at the other end grounded through an electrical conduction path comprised of the lead line 46 and the terminal box 47 so that an input voltage is imposed across the opposite ends of the resistance element 43, and an output voltage of the torque sensor 4 representative of the angular position of contact of the detector elements 44 is taken out from the terminal box 47 via the input/output terminals 45, 45 connected with the detector elements 44 and the lead line 46.

Figure 3:
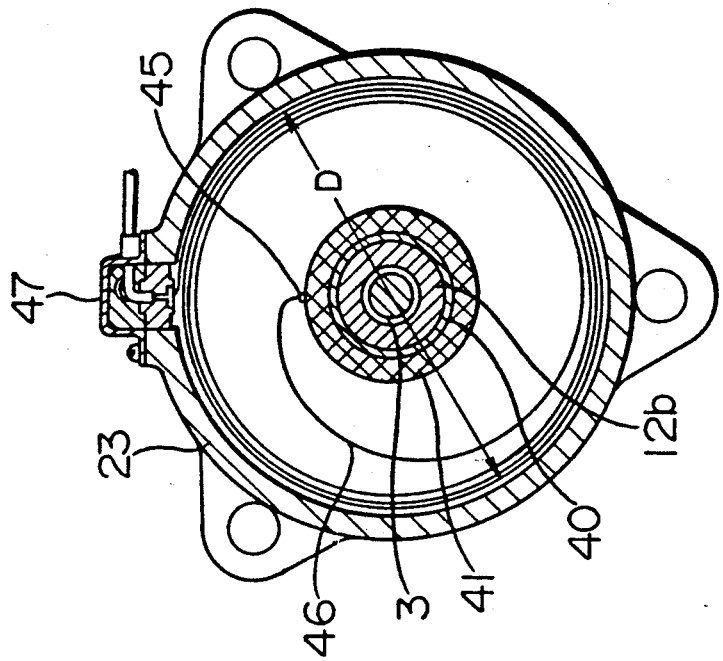
FIGS. 3 and 4 are cross sectional views, on an enlarged scale, taken along the line III—III of FIG. 1, but showing the different winding states of a take-out lead line of the torque sensor.
Figure 4:
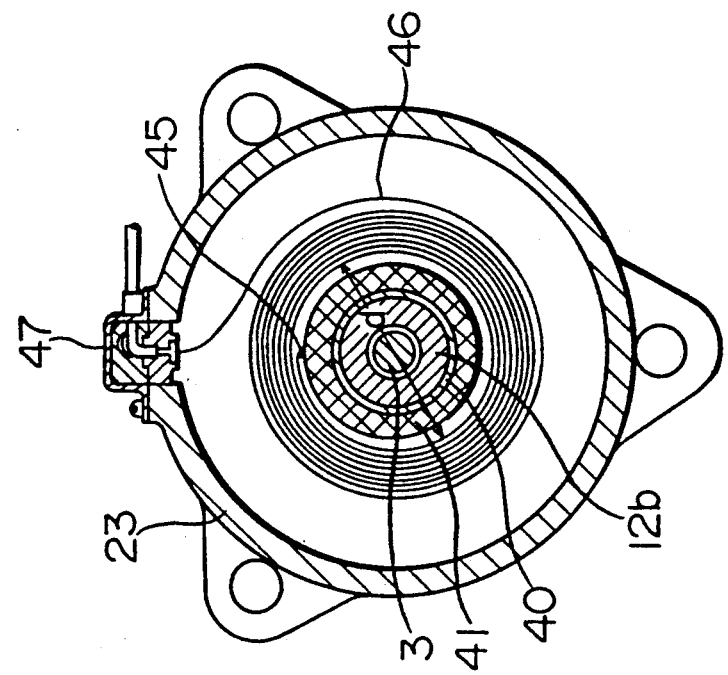

As shown in FIGS. 3 and 4, which are enlarged cross sectional views taken on the line III—III of FIG. 1 but shows different operating states, the lead line 46 is wound around the first holder 41 in one direction in a plurality of turns and accommodated in the lower housing 23 The connecting positions of the lead line 46 at the side of the input/output terminals 45, 45 . . . rotate in accordance with the rotation of the output shaft 12b due to a steering operation by the driver, but on the other hand, the connecting positions of the input/output terminals 45, 45 . . . at the side of the terminal box 47 are stationary, and the winding state of the lead line 46 in the lower housing 23 varies according to the rotational or angular position of the steering wheel. That is, in cases where the lead line 46 is wound around in a clockwise direction when looked at from the steering wheel side as shown in FIGS. 3 and 4, there will be a difference between the number of turns (n) of the lead line 46 when the steering wheel is turned to a first limit position in the right-hand or clockwise direction as shown in FIG. 3 and that (N) when the steering wheel is turned to a second limit position in the left-hand or counter-clockwise direction as shown in FIG. 4, this difference being equal to the number of rotations of the steering wheel from the first limit position to the second limit position if the thickness of the lead line 46 is neglected. Thus, the outside diameter (d) in FIG. 3 and the outside diameter (D) in FIG. 4 of the turns of the lead line 46 are determined by the length of the lead line 46 and the difference between the number of turns (n) in FIG. 3 and the number of turns (N) in FIG. 4.

If the length of the lead line 46 is excessively short or shorter than a predetermined length, the lead line 46 may wind around the outer peripheral surface of the cylindrical portion of the first holder 41 when the steering wheel is turned by the driver in the right-hand or clockwise direction, whereupon it would be subjected to tensile force upon further turning of the steering wheel. On the contrary, if the lead line 46 is excessively long or longer than a predetermined length, the lead line 46 may be repeatedly bent or folded in the lower housing 23 when the steering wheel is turned in the left-hand or counter-clockwise direction. In either of these cases, there is a possibility of the lead line 46 being broken and/or disconnected. In this connection, the possible range of turning of the steering wheel in ordinary vehicles such as automobiles is about 2.5 turns to the right (clockwise) and left (counter-clockwise) direction from the central or neutral position which the steering wheel takes when the vehicle runs straight. Accordingly, in ordinary vehicles, it is possible to avoid occurrence of breaks and/or disconnections of the lead line 46 as described above by appropriately setting the length and number of turns of the lead line 46 as follows: the difference (n−N) is greater than 5; the outside diameter (d) of turns of the lead lines 46 is slightly larger than the diameter of the cylindrical portion of the first holder 41; and the number of turns (D) of the lead line 46 is slightly less than the inside diameter of the lower housing 23 at a location at which the torque sensor 4 is disposed therein.

The output signal of the torque sensor 4 as constructed in the above manner is sent to the input side of a control unit 7 so that, based on the torque sensor output signal, the control unit 7 recognizes the magnitude and direction of the steering torque exerted on the steering wheel by the driver and outputs a drive signal to an electric motor 5 (see FIG. 5), which is used for the purpose of steering assistance and which is electrically connected to the control unit 7 through a unillustrated drive circuit, so that the motor 5 is driven to rotate in the direction corresponding to the turning direction of the steering wheel.

The rotational force of the motor 5 is transmitted to the input shaft 12b through the worm shaft 51 and worm wheel 50. The worm wheel 50 is fitted over the output shaft 12b in a coaxial relation therewith and axially positioned in place with its opposite side surfaces being clamped between the lower shoulder of the enlarged-diameter portion of the output shaft 12b at which the ball bearing 25 is installed, and the upper end face of the cylindrical bearing retainer 26a which is press fitted over the output shaft 12b and on which the ball bearing 26 is fitted. Also, the bearing retainer 26a together with the torsion bar 3 is engaged at its lower portion with the output shaft 12b by means of a fastening pin 3b. Thus, the bearing retainer 26a is restricted against axial and radial movements by means of the output shaft 12b. On the other hand, the ball bearing 26, being fitted over the bearing retainer 26a in an axially positioned state, not only serves to support the output shaft 12b in a radial direction but also bear thrust loads acting on the worm wheel 50 and the motion-conversion mechanism. The worm wheel 50 is properly positioned in the circumferential direction by engaging the head of the dowel pin 50a, which is implanted into the outer peripheral surface of the output shaft 12b, into the rectangular groove which is formed in, and axially extends over the length of, the inner peripheral surface of a through bore which is formed axially through the worm wheel 50, whereby the rotation of the worm wheel 50 is transmitted to the output shaft 12b through the dowel pin 50a.

Figure 5:
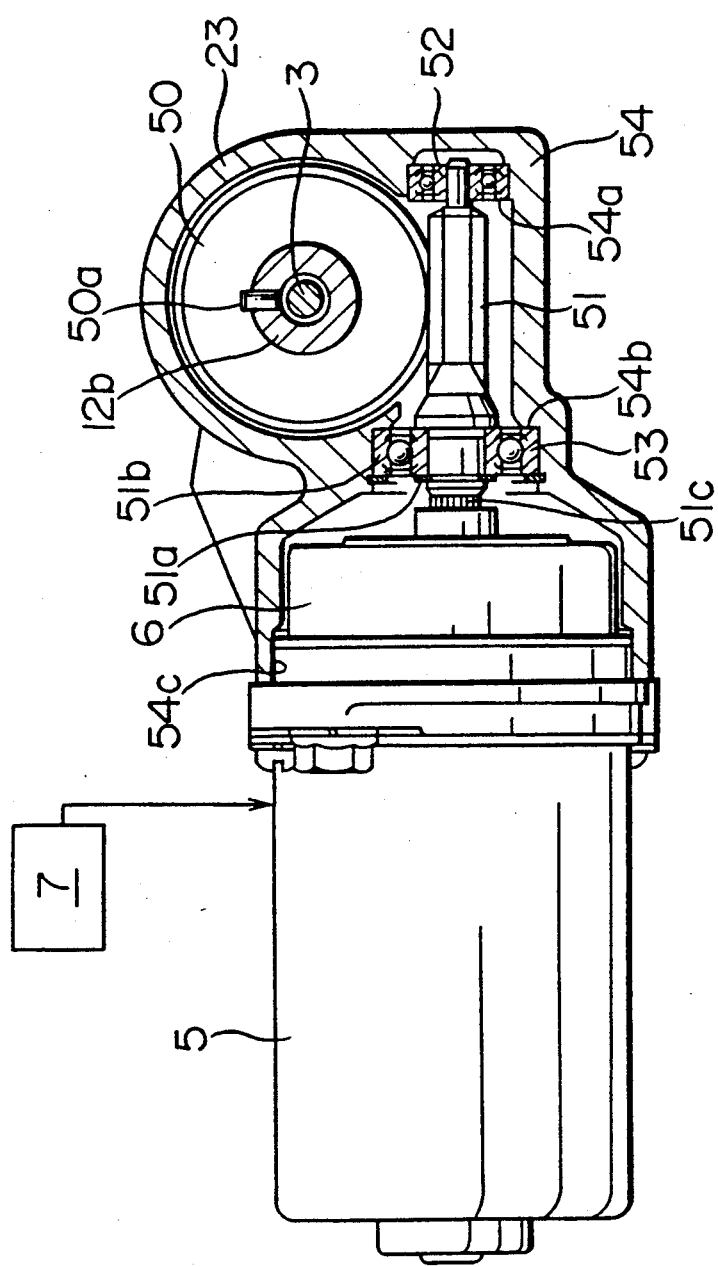
FIG. 5 is a cross sectional view, on an enlarged scale, taken along the line V—V of FIG. 1, showing the arrangement of a power transmission mechanism for transmitting an assisting force from the motor to a steering column.

As shown in FIG. 5, which is an enlarged cross sectional view taken along the line V—V in FIG. 1, a worm-shaft housing 54 in the form of a bottomed cylinder is disposed adjacent and outside, and integrally connected with, the lower housing 23. The worm-shaft housing 54 has a large-diameter opening formed at one side thereof and has its longitudinal axis disposed perpendicular to the axis of the worm-shaft housing 54. Inside the worm-shaft housing 54, the worm shaft 51 is journalled at its opposite ends by a pair of ball bearings 52, 53 with its axis substantially perpendicular to the axis of the output shaft 12b. On the outer peripheral surface of the axially intermediate portion of the worm shaft 51, there are formed worm teeth or threads which are in meshing engagement with the teeth or threads on the outer peripheral surface of the worm wheel 50. One end or the tip (i.e., the right-hand end in FIG. 5) of the worm shaft 51 is of a diameter equal to or less than the minor diameter of the worm threads (i.e., the diameter of a deddendum circle of the worm threads), and it is inserted into, and rotatably supported by, the ball bearing 52 which is press fitted into the reduced-diameter bottomed or closed end of the cylindrical housing 54, whereas the other or basal end (i.e., the left-hand end in FIG. 5) of the worm shaft 51, the diameter of which is equal to or greater than the major diameter of the worm threads (i.e., the diameter of an addendum circle of the worm threads), is rotatably supported by the ball bearing 53 which is press fitted into a intermediate portion of the worm-shaft housing 54. In this manner, the worm shaft 51 is journalled at its opposite ends by the pair of ball bearings 52, 53 with the worm threads meshing with the toothed or threaded outer surface of the worm wheel 50 interposed therebetween. Here, the worm shaft 51 and the ball bearings 52, 53 are assembled together and mounted in the worm-shaft housing 54 in the following manner. First, the ball bearing 53 is fitted over the basal end (i.e., the left-hand end in FIG. 5) of the worm shaft 51 and axially positioned in place with respect to the worm shaft 51 by being firmly clamped between an enlarged or flanged portion formed adjacent the worm threads and a snap ring 51a mounted on the worm shaft 51. Then, the worm shaft 51 with the ball bearing 53 thus mounted thereon is inserted into the worm-shaft housing 54 from the enlarged open end thereof so that the tip end (i.e., the right-hand end in FIG. 5) of the worm shaft 51 is fitted into the ball bearing 52 press fitted in a first small-diameter bore 54a in the worm-shaft housing 54 at its closed end, whereas the ball bearing mounted on the basal end of the worm shaft 51 is fitted into a second large-diameter bore 54b, which is formed in the intermediate portion of the worm-shaft housing 54 adjacent its open end in a coaxial relation with respect to the first bore 54a, and axially positioned in place with respect to the worm-shaft housing 51 by being fixedly clamped between an inside shoulder of the second bore 54b and a snap ring 51b secured to the radially inner peripheral surface of the second bore 54b. Accordingly, the ball bearing 53 serves to support the worm shaft 51 not only in the radial direction but also in the axial or thrusting direction so that a thrust load acting on the worm shaft 51 due to the meshing engagement between the threaded outer surface of the worm wheel 50 and the worm threads on the worm shaft 51 is loaded thereon.

The motor 5 for steering assistance has its rotation shaft operatively connected with an electromagnetic clutch 6 in axial alignment with each other. The clutch 6 is provided at its one side with a spigot portion which is fitted into an enlarged socket portion 54c which is formed at the enlarged open end of the worm-shaft housing 51 in a coaxial relation with respect to the bearing mounting bores 54a, 54b, the spigot portion being fixedly secured to the socket portion 54c by means of mounting bolts.

On the outer peripheral surface of the basal end of the worm shaft 51, there is formed an axial spline 51c through which the worm shaft 51 is engaged with the output shaft of the electromagnetic clutch 6 for integral rotation therewith. In this manner, the rotational force of the motor 5 is transmitted via the electromagnetic clutch 6 to the worm shaft 51 and thence to the output shaft 12b through the worm wheel 50 in mesh with the worm shaft 51.

With the power transmission mechanism as constructed in the above manner, it should be noted that because of the spline connection between the electromagnetic clutch 6 and the worm shaft 51, the motor 5 together with the electromagnetic clutch 6 can be removed from the socket portion 54c of the worm-shaft housing 54 simply by untightening the mounting bolts and then pulling the motor 5 and the electromagnetic clutch 6 outwardly from the worm-shaft housing socket portion 54c in the axial direction. Also, due to the fact that the diameter of the tip portion of the worm shaft 51 is less than the minor diameter of the worm threads thereon, the worm shaft 51 can be easily taken out from the worm-shaft housing 54 through the enlarged open end thereof by removing the snap ring 51b and pulling the worm shaft 51 outward while rotating the worm shaft 51. Accordingly, when the meshing engagement between the worm wheel 50 and the worm shaft 51 is poor or unsatisfactory upon initial assembly thereof, the worm shaft 51 can be taken out from the worm-shaft housing 54 in the above-described manner and replaced with another one whereby the engagement between the worm wheel 50 and the worm shaft 51 can be properly adjusted or improved with ease without adjusting or modifying any other parts or portions. Furthermore, it is possible to effect maintenance and inspection of the transmission mechanism without any difficulty simply by taking out the worm shaft 51 from the worm-shaft housing 54 without disassembling other parts or portions, thus resulting in a substantial improvement in working efficiency.

Supply of driving current to the motor 5 is controlled by means of a control signal which is issued by the control unit 7 based on the steering torque detected by the torque sensor 4. The rotational force of the motor 5 is transmitted to the output shaft 12b through the electromagnetic clutch 6, the worm shaft 51 and the worm wheel 50, as described above, and thence to the rotational-to-linear motion conversion mechanism connected with the lower end of the output shaft 12b so that the steerable wheels are steered to the right or left in accordance with the output of the motion conversion mechanism.

Figure 8:
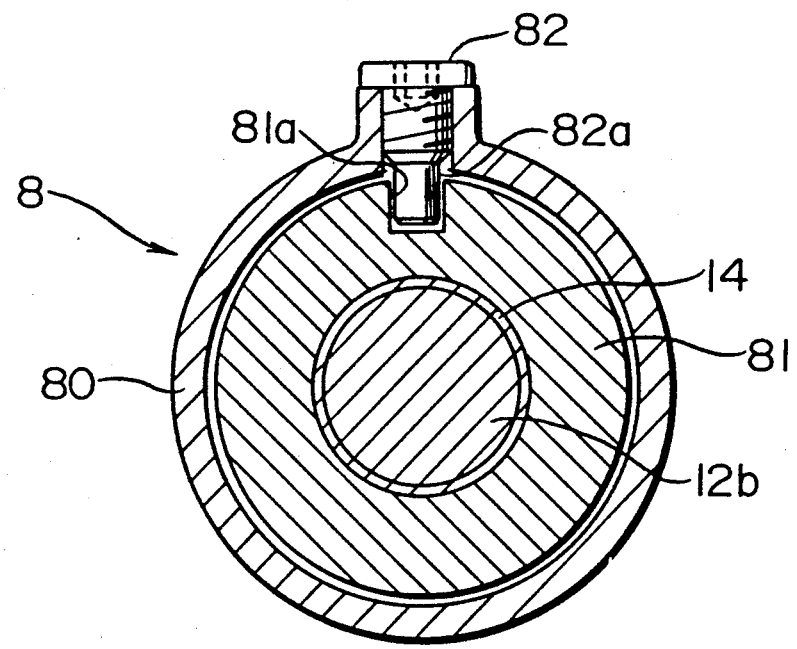
FIG. 8 is a cross sectional view taken along the line VIII—VIII of FIG. 1, showing a rotation limiting means.

As illustrated in FIGS. 1 and 8, installed on the lower portion of the output shaft 12b extending downwards from the mounting position of the bearing retainer 26a is a rotation limiting means 8 for mechanically limiting the rotation of the output shaft 12b within a predetermined number of turns. As referred to above, the lead line 46 of the torque sensor 4 is chosen to be of just such a length that it is not cut off or broken at its connection with the terminals when the output shaft 12b rotates about 2.5 turns to the right or left from the center or neutral position at which the vehicle runs straight. If, however, the output shaft 12b further rotates in excess of 2.5 turns, the lead line 46 may be cut off or broken. Therefore, the rotation limiting means 8 is provided for preventing any excessive rotation of the output shaft 12b in a mechanical manner thereby to prevent such cuttings or breaks of the lead line 46. The rotation limiting means 8 comprises a cylindrical housing 80 disposed adjacent, and integrally connected with, the lower portion of the lower housing 23 in a coaxial relation therewith, and a movable member 81 in the form of an inwardly threaded cylinder or nut which is formed of a metal and which is loosely fitted into the lower housing 80 with its female threads on the inside surface thereof being engaged with the male threads 14 on the outer peripheral surface of the lower portion of the output shaft 12b.

Figure 9:
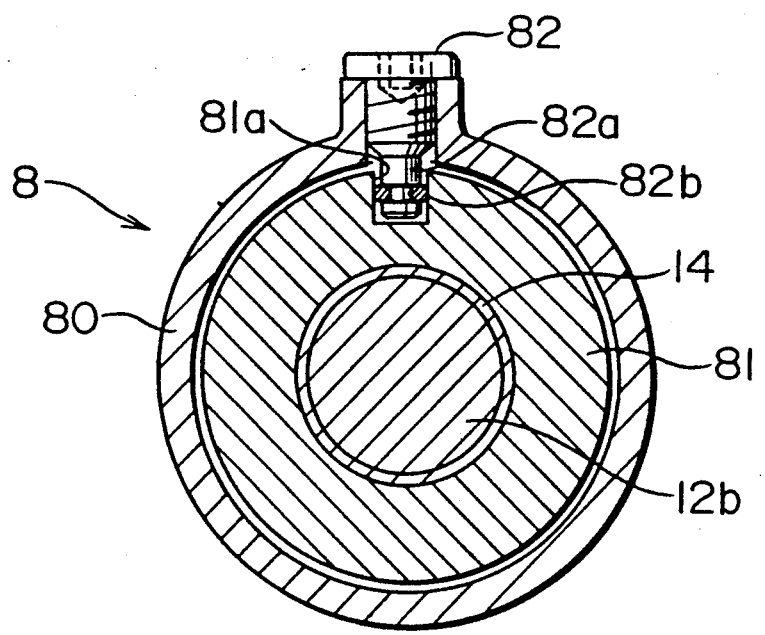
FIG. 9 is a cross sectional view similar to FIG. 8, but showing a modified form of a rotation limiting means.

A restriction member 82 is provided at a substantially longitudinally central portion of the cylindrical housing 80 in such a manner that it radially extends through the cylindrical side wall of the housing 80 with its tip projected therein an appropriate distance so as to be engaged with an elongated groove 81a, which is axially formed in the outer peripheral surface of the movable member 81 over the entire axial length thereof, for checking the rotation of the movable member 81 relative to the housing 80 while permitting relative axial movement therebetween. In the embodiment of FIG. 1, the restriction member 82 comprises a screw formed of a metal which is threaded in an internally threaded radial hole in the cylindrical side wall of the housing 80, and which has a reduced-diameter cylindrical tip 82a engaged in the elongated groove 81a in the movable member 81. In this case, however, the tip 82a of the screw 82, being in sliding contact with the inner surfaces of the elongated groove 81a in the movable member 81, is liable to generate noise and wear during repeated rotations of the output shaft 12b. Accordingly, as pictured in FIG. 9, it is preferable that an O ring 82b of an elastomeric material having a low friction coefficient be fitted in an annular groove, which is formed in the cylindrical surface of the tip 82a of the screw 82, so that the screw tip 82a is not in direct sliding contact with the movable member 81 but in indirect contact therewith through the O ring 82b, thereby preventing the generation of noise resulting from a metal-to-metal contact between the screw tip 82a and the movable member 81 as well as vibrations of the movable member 81. When the O ring 82b has been worn out, the screw 82 is readily removed from the cylindrical housing 80 so that the worn O ring 82b can be replaced by a new one.

Figure 11:
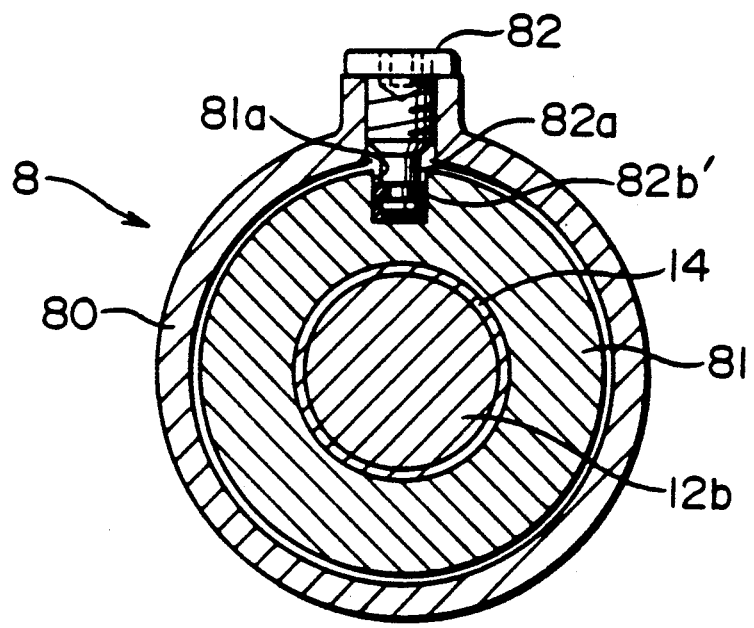
FIG. 11 is a cross-sectional view showing another modified form of a rotation limiting means.

In this connection, instead of providing the O ring 82b, a lining or coating 82b (FIG. 11) of an appropriate thickness, which is formed of an elastomeric material such as rubber, resin or the like having a low friction coefficient, may be provided on at least one of the surface of the screw tip 82a or the surface of the elongated groove 81a in the movable member 81, or a thin strip of an appropriate thickness, which is formed of rubber, resin or the like having a low friction coefficient, may be adhered to the surface of the screw tip 82a or the surface of elongated groove 81a.

Further, the restriction member 82 for restricting the rotation of the movable member 81 with respect to the housing 80 is not limited to the screw as employed in the above embodiment, but it may comprise another appropriate restricting member such as a pin which is slidably inserted in a radial hole formed through the cylindrical side wall of the housing 80 and which has a tip projected into and engaged with the elongated groove 81a in the movable member 81. Moreover, though not illustrated, the restriction member 82 may comprise a cylindrical housing having an internal surface of a polygonal configuration in cross section, and a movable member having an outer surface of a corresponding polygonal cross section and fitted in the cylindrical housing for axial sliding movement relative thereto. In this manner, the movable member is slidable in the axial direction with respect to the housing but restricted from its rotation relative to the housing by the engagement between the polygonal shaped inner surface of the housing and the complementary shaped outer surface of the movable member.

Also, threadedly fitted in the lower portion of the housing 80 is a cylindrical bearing casing 85 which has a ball bearing 84 press fitted therein for rotatably supporting the lower end of the output shaft 12b. The bearing casing 85 has its upper end face 85a disposed in a face-to-face relation with, and spaced an appropriate axial distance from, a downwardly or inwardly directed shoulder 80a which is formed on the housing 80 in an upper portion of the inner peripheral surface thereof. With the above-described arrangement, the movable member 81, being prevented from rotation by means of the restriction member 82, is caused to axially move along the output shaft 12b through the screwing action of the threaded engagement between the threaded inner surface of the movable member 81 and the output shaft threaded portion 14 in accordance with the rotation of the output shaft 12b. Such an axial movement of the movable member 81 is limited within a predetermined range which is defined by the abutment of the upper and lower ends of the movable member 81 against the downwardly or inwardly directed shoulder 80a in the inner upper portion of the housing 80 and the upper end face 85a of the bearing casing 85, respectively. As a result, any further rotation of the output shaft 12b beyond the upper and lower limit positions is prevented. Accordingly, if the axial distance between the shoulder 80a and the upper end face 85a of the bearing casing 85 is chosen to be five times greater than the sum of the lead of the threaded portion 14 of the output shaft 12b and the axial length of the movable member 81, and if the movable member 81 is initially set at a position axially central between the shoulder 80a and the upper end face 85a of the bearing casing 85, the rotation of the output shaft 12b is restricted to 2.5 turns to the right or left from its neutral or straight-forward position whereby cuttings or breaks of the lead line 46 of the torque sensor 4 are securely avoided.

Figure 10:
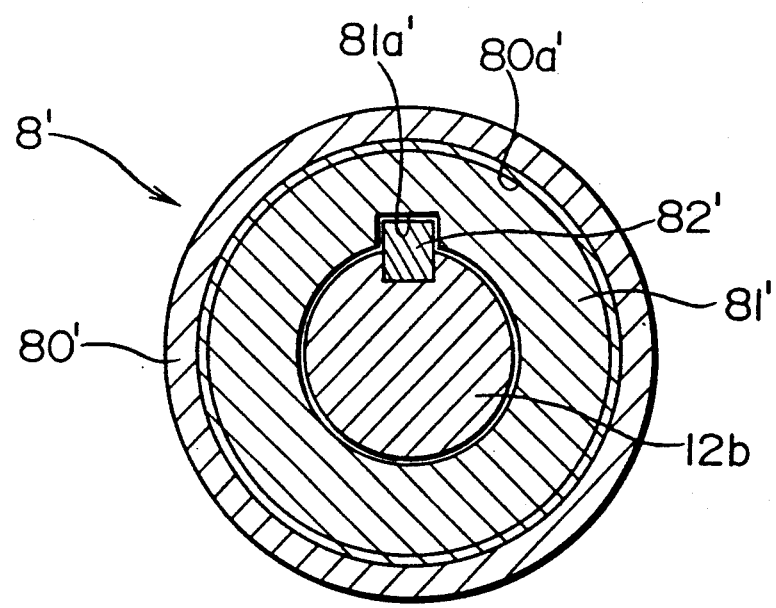
FIG. 10 is a cross sectional view similar to FIG. 8, but showing a further embodiment of a rotation limiting means.

FIG. 10 illustrates a further embodiment of a rotation limiting means. In this embodiment, the rotation limiting means 8' comprises a cylindrical housing 80' disposed adjacent, and integrally connected with, the lower portion of the lower housing 23 in a coaxial relation therewith, and a stop or movable member 81' in the form of an outwardly threaded cylinder which is formed of a metal and which is loosely fitted over a lower portion of the output shaft 12b for axial movement relative thereto with its male threads on the outside surface thereof being engaged with female threads 80a' which are formed on the inner peripheral surface of the cylindrical housing 80' over an appropriate axial length thereof.

A restriction member 82' in the form of a key is provided between the output shaft 12a and the cylindrical stop member 81' for suppressing the rotation of the stop member 81' relative to the output shaft 12a while permitting relative axial movement therebetween. The key 82' is, on one hand, tightly fitted in and firmly secured to the output shaft 12b and, on the other hand, loosely fitted into an elongated key groove, which is axially formed in the inner peripheral surface of the cylindrical stop member 81' over the entire axial length thereof, for axial sliding movement relative thereto. With this arrangement, the cylindrical stop member 81', being restricted by the key 82' to rotate together with the output shaft 12b, is caused to axially move relative to the housing 80' through the screwing action of the threaded engagement between the cylindrical stop member 81' and the housing 80' when the output shaft 12b rotates. The function and operation of the cylindrical stop member 81' other than the above are substantially the same as the movable member 81 of FIG. 1 or FIG. 8, and hence a further description thereof will be unnecessary.

Although in the above-described embodiment, the stop means such as the stop shoulder 80a and the stop end face 85a of the bearing casing 85 for defining an upper limit and a lower limit of the axial movement of the movable member 81 or 81' are provided on the side of the housing 80, they may comprise a pair of stop members which are attached to the output shaft 12b at locations axially spaced an appropriate distance from each other. Such stop members may be stop nuts which are threaded over appropriate portions of the output shaft 12b and which are fixed by appropriate fixing means to the output shaft 12b against relative rotation.

In the above-described embodiment, a potentiometer is employed as the torque sensor 4, but other types of torque sensors such as, for example, a strain gage, which is attached to a portion of the steering column 1 for detecting the steering torque as a strain developed in the steering column 1, may also be used.

Further, the mounting position of the torque sensor 4 is not limited to an intermediate portion of the steering column 1 as in the above-described embodiment, but the torque sensor 4 can be mounted on an shaft member such as, for example, a pinion shaft of a rack and pinion type motion-conversion mechanism, which rotates with the rotation of the steering wheel. Similarly, the mounting position of the motor 5 is of course not limited to the one shown in the described embodiment, but it may be any position nearer to the steerable wheels than to the mounting position of the torque sensor 4.

As is clear from the foregoing description, according to the present invention, the taking out of the output signal from the torque sensor secured to the steering shaft operatively connected with the steering wheel and the application of an input voltage to the torque sensor in the form of a potentiometer are effected through the lead line which is accommodated in the worm-shaft housing while being wound around the steering shaft. As a consequence, it is possible to assemble the torque sensor to the steering column simply by connecting the lead line with the terminals on the torque sensor side and the terminals fixedly provided outside the steering column. This serves to markedly reduce the time and labor required for assembling the torque sensor. Further, there is no or little possibility of gradual deterioration in the detecting accuracy of the steering torque which would otherwise conventionally result from increasing wear on the brushes over time. Also, there is no or little possibility of discontinuous or intermittent detection of the steering torque resulting from improper or poor electrical connections between the slip rings and the brushes, so that steering torque can be continuously detected with a high level of accuracy. Accordingly, it is ensured that the steerable wheels of the vehicle can be steered in an amount corresponding exactly to the steering or rotational amount of the steering wheel.

In further accordance with the present invention, the rotation of the steering column is limited within a certain predetermined range by means of the rotation limiting means. With this arrangement, it is possible to substantially eliminate the possibility of cuttings and breaks of the lead line while reducing the length of the lead line as much as possible. This serves not only to improve the reliability and durability of the power steering apparatus but also decrease the volume of the housing required for accommodating the lead line, so that restrictions on the mounting position of the torque sensor can be materially reduced.

We claim:

1. A power steering apparatus for power steering the steerable wheels of a vehicle comprising:
   a steering wheel;
   a steering column having one end connected with said steering wheel and the other end operatively connected with the steerable wheels;
   a housing means for surrounding said steering column;
   a torque sensor disposed in said housing means for detecting a steering torque exerted on said steering wheel by a driver;
   a lead line wound around said steering column and accommodated in said housing means, said lead line having one end electrically connected to said torque sensor and the other end to terminal means which is disposed outside said steering column; and
   a motor installed on said housing means and operatively connected with said steering column for power assisting the steering effort exerted on the steering wheel by the driver, said motor being driven to run in accordance with the steering torque detected by said torque sensor.

2. A power steering apparatus according to claim 1, further comprising a rotation limiting means disposed between said steering column and said housing means for limiting the rotation of said steering column within a predetermined range.

3. A power steering apparatus according to claim 1 wherein said steering column has an outer peripheral surface and said rotation limiting means comprises:
   a cylindrical movable member disposed in said housing means for axial movement relative thereto, said movable member being fitted over said steering column and threadedly engaged at its inside surface with the outer peripheral surface of said steering column;
   a restriction member disposed between said housing means and said movable member for restricting the rotation of said movable member relative to said housing means while permitting the axial movement of said movable member relative to said housing means; and
   stop means for limiting the range of axial movement of said movable member with respect to said steering column.

4. A power steering apparatus according to claim 3, wherein said housing means comprises a cylindrical housing having a threaded hole radially formed through the cylindrical side wall thereof, and said movable member has an axial elongated groove formed in its outer peripheral surface over the entire axial length thereof, wherein said restriction member comprises a screw threaded into the threaded radial hole in the cylindrical side wall of said housing, said screw having a tip projected into said slidably engaged with the elongated groove in said movable member.

5. A power steering apparatus according to claim 4, further comprising a lining of an elastomeric material having a low coefficient of friction provided on the outer peripheral surface of the tip of said screw for preventing it from directly contacting the groove surface.

6. A power steering apparatus according to claim 4, further comprising a lining of an elastomeric material having a low coefficient of friction provided on the surface of the elongated groove in said movable member for preventing the tip of said screw from directly contacting the groove surface.

7. A power steering apparatus according to claim 4, further comprising a coating of an elastomeric material having a low coefficient of friction provided on the outer peripheral surface of the tip of said screw for preventing it from directly contacting the groove surface.

8. A power steering apparatus according to claim 4, further comprising a coating of an elastomeric material having a low coefficient of friction provided on the surface of the elongated groove in said movable member for preventing the tip of said screw from directly contacting the groove surface.

9. A power steering apparatus according to claim 3, wherein said stop means comprises a pair of first and second limit stops provided on said cylindrical housing at locations axially spaced a predetermined distance from each other on the opposite sides of said movable member, said first and second limit stops being adapted to be selectively placed in abutting engagement with a corresponding one of the opposite ends of said movable member for defining a range of the axial movement of said movable member relative to said steering shaft.

10. A power steering apparatus according to claim 9, further comprising a cylindrical bearing casing firmly fitted in said cylindrical housing at its one end for rotatably supporting one end of said steering column, wherein said first limit stop comprises a shoulder formed in the inner surface of said cylindrical housing at its other end, and said second limit stop comprises an end face of said cylindrical bearing casing which is in an axially spaced face-to-face relation with respect to said shoulder.

11. A power steering apparatus according to claim 3, wherein said stop means comprises a pair of first and second limit stops provided on said steering column at locations axially spaced a predetermined distance from each other on the opposite sides of the movable member, said first and second limit stops being adapted to be selectively placed in abutting engagement with a corresponding one of the opposite ends of said movable member for defining a range of the axial movement of said movable member relative to said steering shaft.

12. A power steering apparatus for power steering the steerable wheels of a vehicle comprising:
   a steering wheel;
   a steering column having one end connected with said steering wheel and the other end operatively connected with the steerable wheels;
   a housing means for surrounding said steering column, wherein said housing means comprises a cylindrical housing having a threaded hole radially formed through the cylindrical side wall thereof;
   a torque sensor disposed in said housing means for detecting a steering torque exerted on said steering wheel by a driver;
   a lead line wound around said steering column and accommodated in said housing means, said lead line having one end electrically connected to said torque sensor and the other end to terminal means which is disposed outside said steering column;

a motor installed on said housing means and operatively connected with said steering column for power assisting the steering column for power assisting the steering effort exerted on the steering wheel by the driver, said motor being driven to run in accordance with the steering torque detected by said torque sensor;

rotation limiting means disposed between said steering column and said housing means for limiting the rotation of said steering column within a predetermined range, said rotation limiting means comprising:

a cylindrical movable member disposed in said housing means for axial movement relative thereto, said movable member being fitted over said steering column and threadedly engaged at its inside surface with an outer peripheral surface of said steering column, said movable member having an axial elongated groove formed in its outer peripheral surface and over an entire axial length thereof;

a restriction member disposed between said housing means and said movable member for restricting the rotation of said movable member relative to said housing mean while permitting the axial movement of said moveable member relative to said housing means, said restriction member comprising a screw threaded into the threaded radial hole in the cylindrical side wall of said housing, said screw having a tip projected into a slidably engaged with the elongated groove in said movable member; and stop means for limiting the range of axial movement of said movable member with respect to said steering column; and an O ring which is fitted on the tip of said screw and which is in sliding contact at its outer periphery with the surface of the elongated groove in said movable member for preventing the screw tip from directly contacting the groove surface.

* * * * *